(12) United States Patent
Kasuga (10) Patent No.: US 9,759,887 B2
(45) Date of Patent: Sep. 12, 2017

(54) CAMERA MODULE

(71) Applicant: SHARP KABUSHIKI KAISHA, Osaka-shi, Osaka (JP)

(72) Inventor: Kyoji Kasuga, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 87 days.

(21) Appl. No.: 14/765,650

(22) PCT Filed: Dec. 9, 2013

(86) PCT No.: PCT/JP2013/082986
§ 371 (c)(1),
(2) Date: Aug. 4, 2015

(87) PCT Pub. No.: WO2014/122849
PCT Pub. Date: Aug. 14, 2014

(65) Prior Publication Data
US 2015/0370034 A1    Dec. 24, 2015

(30) Foreign Application Priority Data
Feb. 5, 2013 (JP) .................................. 2013-020900

(51) Int. Cl.
G02B 7/02 (2006.01)
G02B 7/04 (2006.01)
G02B 7/08 (2006.01)

(52) U.S. Cl.
CPC .............. G02B 7/04 (2013.01); G02B 7/022 (2013.01); G02B 7/025 (2013.01); G02B 7/08 (2013.01)

(58) Field of Classification Search
CPC . G02B 7/022; G02B 7/04; G02B 7/08; G02B 7/025; G02B 7/02
USPC ....... 359/704, 811, 815, 819, 823, 824, 827; 348/376, E5.024; 285/92, 353
See application file for complete search history.

(56) References Cited

FOREIGN PATENT DOCUMENTS

| JP | 2005-195682 A | 7/2005 |
|---|---|---|
| JP | 2005195682 A * | 7/2005 |
| JP | 2007-047590 | 2/2007 |
| JP | 2009-031694 | 2/2009 |
| JP | 2009181084 A * | 8/2009 |
| JP | 2010-156887 | 7/2010 |
| JP | 2011-002516 | 1/2011 |
| JP | 2011-175027 | 9/2011 |

OTHER PUBLICATIONS

Japanese Office Action mailed May 10, 2016 in JP patent application 2014-560648.
International Search Report for PCT/JP2013/082986 dated Mar. 11, 2014, four pages.
Written Opinion of the ISA for PCT/JP2013/082986 dated Mar. 11, 2014, five pages.

* cited by examiner

Primary Examiner — Scott J Sugarman
Assistant Examiner — Mustak Choudhury
(74) Attorney, Agent, or Firm — Nixon & Vanderhye P.C.

(57) ABSTRACT

According to a camera module (1), a lens barrel (2) and a lens holder (8) adhere to each other via an adhesive layer (12), and the lens barrel (2) has a recess (2a) having a bottom surface (2a3) that is located between an upper side surface (8a1) and a lower side surface (8a2) of a groove (8a).

5 Claims, 7 Drawing Sheets

CAMERA MODULE

This application is the U.S. national phase of International Application No. PCT/JP2013/082986 filed 9 Dec. 2013 which designated the U.S. and claims priority to JP Patent Application No. 2013-020900 filed 5 Feb. 2013, the entire contents of each of which are hereby incorporated by reference.

TECHNICAL FIELD

The present invention relates to a camera module which is to be provided in an electronic device such as a mobile phone.

BACKGROUND ART

Conventionally, an image pickup lens is provided and fixed to a lens drive section during assembly of a camera module. In this case, it is necessary to accurately set an initial position of the image pickup lens in an optical axis direction with respect to an image pickup device so as to prevent an out-of-focus image due to defocusing.

The image pickup lens of the camera module is conventionally provided by providing (i) an outer circumferential surface of an optical section including the image pickup lens and (ii) an inner circumferential surface of a holder section holding the optical section with respective screws, and causing the screws to positionally adjust the optical section with respect to the holder section. In this case, the screws have not only such a positional adjustment function as described above but also a function of fixing the holder section and the lens drive section to each other.

However, the arrangement in which the screws are used to positionally adjust the image pickup lens, i.e., the optical section and to fix the optical section makes it necessary to form an external screw and an internal screw with high accuracy and thus easily increases production cost.

Under the circumstances, there has been proposed a method for easily providing the optical section by use of an adhesive instead of the screws. For example, Patent Literature 1 discloses a method for causing only an adhesive to fix an optical section and a holder section (lens drive section) to each other without providing the optical section with a screw. According to this method, in order that the optical section and the holder section adhere to each other with higher adhesive strength, an area of adhesion between the optical section and the holder section is increased by applying the adhesive to each of an outer circumferential surface of the optical section and an inner circumferential surface of the holder section by rotating the optical section.

CITATION LIST

Patent Literature

[Patent Literature 1]
Japanese Patent Application Publication Tokukai No. 2011-175027 (Publication Date: Sep. 8, 2011)

SUMMARY OF INVENTION

Technical Problem

As described above, a camera module disclosed in Patent Literature 1 is arranged such that the optical section and the holder section adhere to each other with higher adhesive strength by increasing the area of adhesion between the optical section and the holder section by application of the adhesive to each of the outer circumferential surface of the optical section and the inner circumferential surface of the holder section. This requires a step of spreading the adhesive over each of the outer circumferential surface of the optical section and the inner circumferential surface of the holder section by rotating the optical section, and consequently requires a longer time for a process for assembling the camera module.

Further, according to the camera module disclosed in Patent Literature 1, during the assembly of the camera module, the optical section is rotated on a base supporting the optical section and the holder section. This causes problems of (i) production of a foreign matter due to friction between the optical section and the base section and (ii) a deterioration in accuracy in height of the optical section.

In view of the above problems, the present invention has an object to provide a camera module that allows adhesion of an optical section to a holder section with higher adhesive strength and a simple configuration without causing a deterioration in assembly accuracy.

Solution to Problem

In order to attain the object, a camera module according to an aspect of the present invention is a camera module including: a lens holding member for holding an image pickup lens; a cylindrical holding member for holding the lens holding member; and an adhesive layer for causing the lens holding member and the cylindrical holding member to adhere to each other, the cylindrical holding member (i) having a shape of a cylinder having a fitting hole, (ii) holding the lens holding member in a state in which the lens holding member is fitted in the fitting hole, and (iii) having an inner circumferential surface on which the fitting hole is provided, the inner circumferential surface having a groove that is provided in a circumferential direction, the lens holding member having a recess recessed with respect to each of a light entrance side end surface and an outer circumferential surface of the lens holding member, the outer circumferential surface facing the inner circumferential surface of the cylindrical holding member, the recess having a bottom surface located at a place in a light entrance direction, and the bottom surface and the groove having a first positional relationship therebetween such that the bottom surface of the recess is located between an upper side surface and a lower side surface of the groove in a direction toward the light entrance side end surface, and the adhesive layer being provided on the bottom surface of the recess so as to extend into the groove, the groove being located so as to face the recess.

Advantageous Effects of Invention

According to an aspect of the present invention, it is possible to cause the lens holding member holding the image pickup lens and the cylindrical holding member holding the lens holding member to adhere to each other with higher adhesive strength and a simple configuration without causing a deterioration in assembly accuracy.

DESCRIPTION OF EMBODIMENTS

Embodiment 1

The following description discusses an embodiment of the present invention with reference to the drawings.

Figure 1:
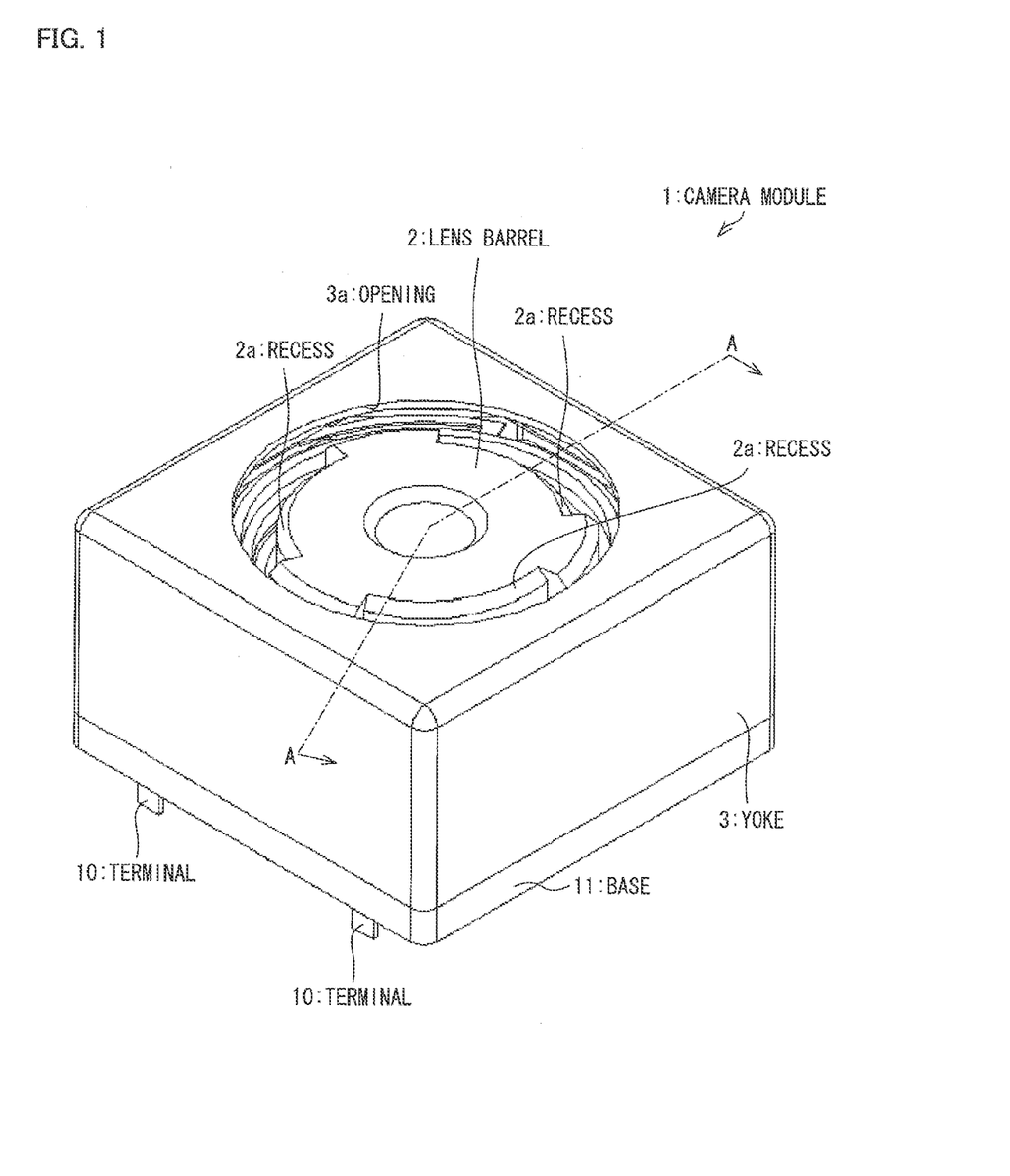
FIG. 1 is a perspective view illustrating a camera module of an embodiment of the present invention.
Figure 2:
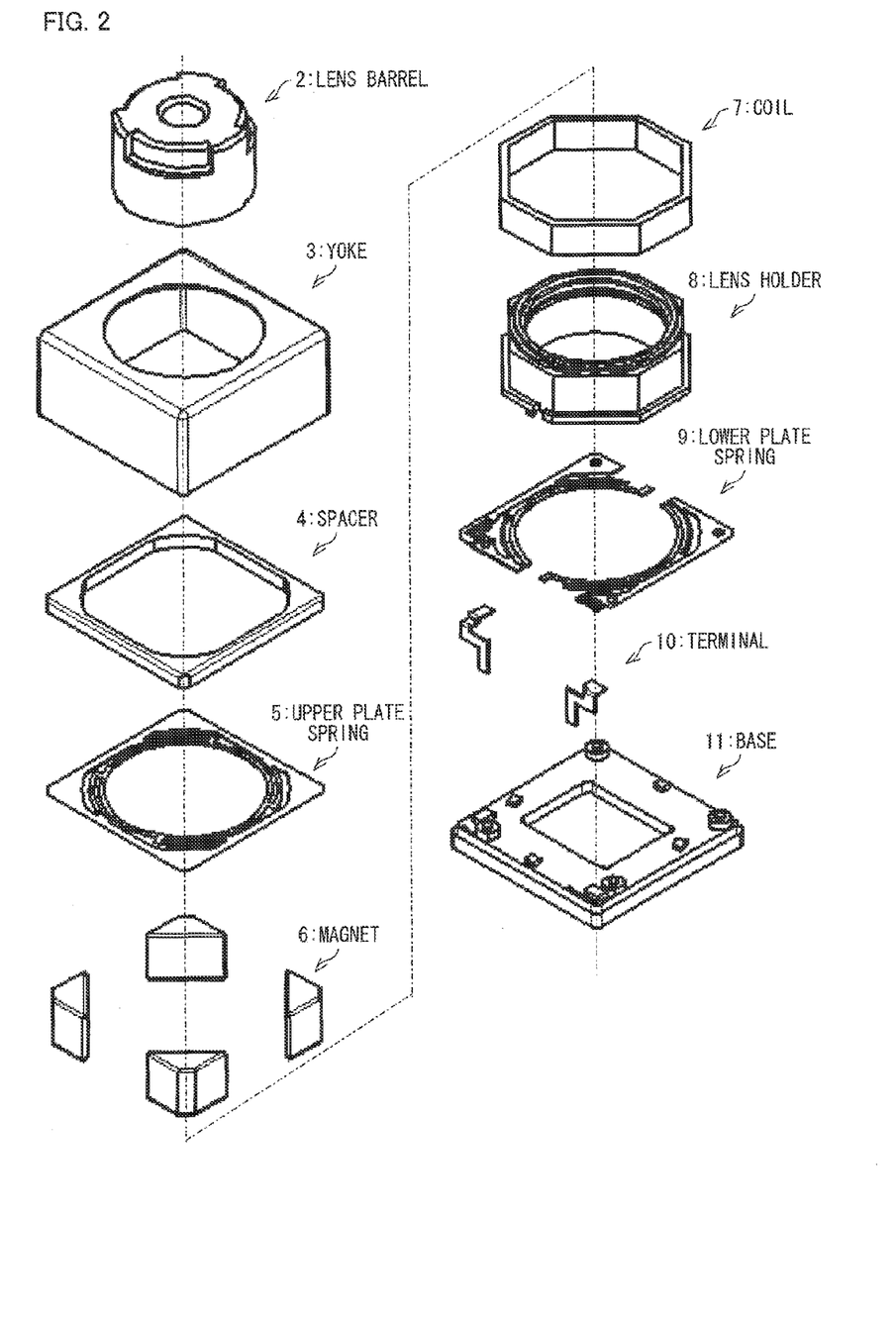
FIG. 2 is an exploded perspective view of the camera module illustrated in FIG. 1.
Figure 3:
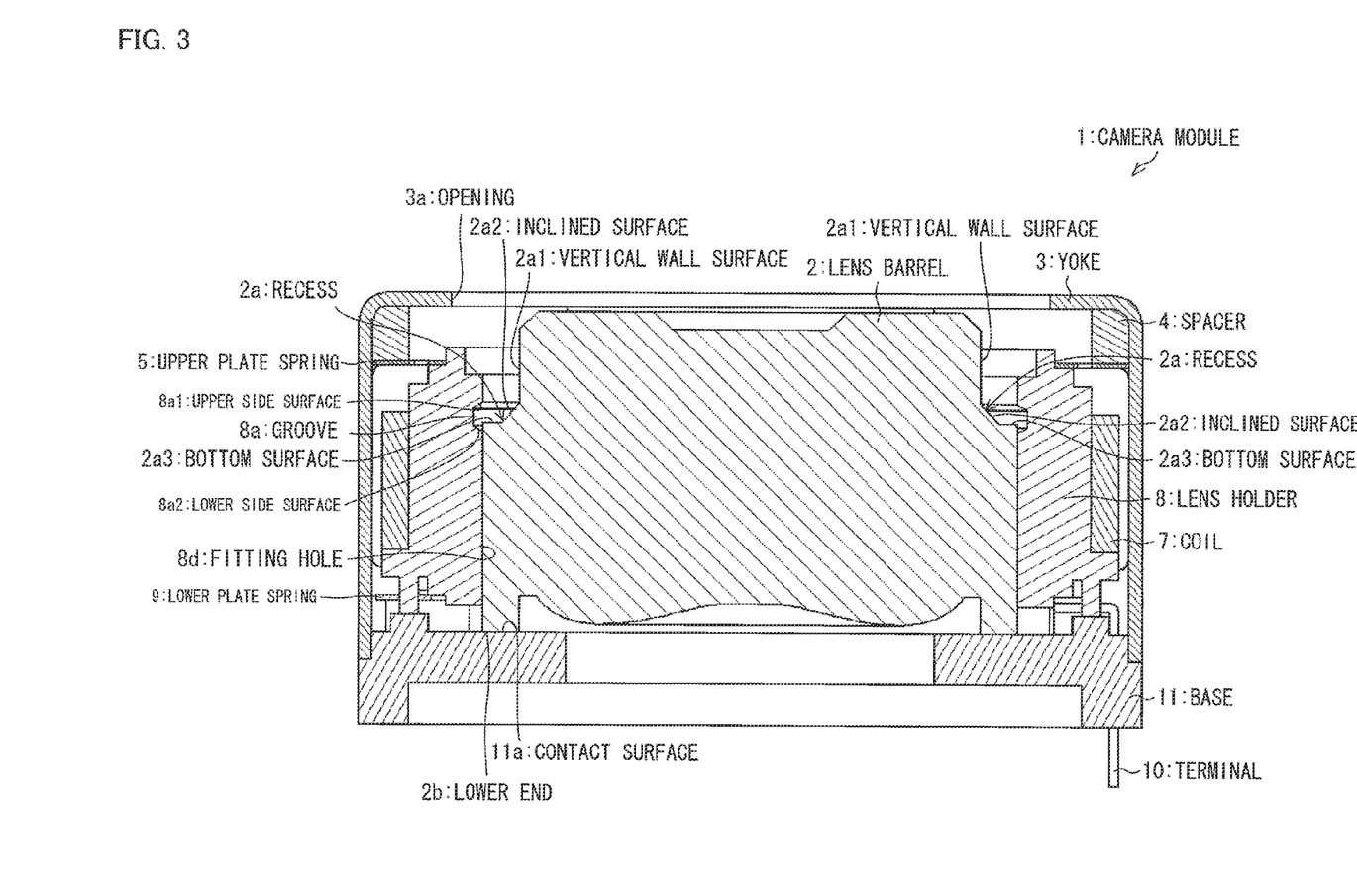
FIG. 3 is a cross-sectional view of the camera module 1 viewed along arrows A-A in FIG. 1.

FIG. 1 is a perspective view illustrating a camera module 1 of an embodiment of the present invention. FIG. 2 is an exploded perspective view of the camera module 1 illustrated in FIG. 1. FIG. 3 is a cross-sectional view of the camera module 1 viewed along arrows A-A in FIG. 1.

(Outline of Overall Configuration)

As illustrated in FIGS. 1 through 3, the camera module 1 includes a lens barrel 2, a yoke 3, a spacer 4, an upper plate spring 5, magnets 6, a coil 7, a lens holder 8, a lower plate spring 9, terminals 10, and a base 11.

The camera module 1 of the present embodiment is a VCM camera module using a voice coil motor (VCM) as a driving source of the lens holder 8 and the lens barrel 2 that move together in an optical axis direction. The camera module 1 includes not only the above members but also a sensor substrate (not illustrated) and an image pickup device (not illustrated). The image pickup device is made up of, for example, a charge coupled device (CCD) image sensor or a complementary metal oxide semiconductor (CMOS) image sensor.

The base 11 is square and plate-like in shape, and has a central part provided with an opening 3a having a rectangular shape. The base 11 has an undersurface from which the terminals 10 protrude downward. The base 11 has a lower part in which the sensor substrate is provided. The sensor substrate includes not only the image pickup device but also an electronic component (not illustrated) such as a clock generation source.

The yoke 3 is provided on the base 11. The yoke 3 has a shape of a container which is square in plan view. The yoke 3 has an open lower part and has an opening 3a provided in a central part of an upper wall of the yoke 3.

The lower plate spring 9 is provided on the base 11 in the yoke 3. On the lower plate spring 9, the lens holder 8 having a cylindrical shape is provided. The lens holder 8 has an octagonal shape in plan view and has a central part provided with a fitting hole 8d having a circular shape. The fitting hole 8d is a hole having a columnar shape and being through the lens holder 8 in an axial direction.

The coil 7 is provided on an outer circumferential surface of the lens holder 8 and has an octagonal frame shape so as to correspond to the shape of the lens holder 8. The magnets 6 are provided at four corners of the yoke 3 so as to face an outer circumferential surface of the coil 7. The upper plate spring 5 is provided on the lens holder 8. The coil 7 and the magnets 6 constitute a magnetic circuit for moving the lens holder 8 and the lens barrel 2.

While the lens holder 8 is radially positioned, the lower plate spring 9 and the upper plate spring 5 support the lens holder 8 so that the lens holder 8 can move in the optical axis direction. The spacer 4 is square and frame-like in shape, and is provided between the upper plate spring 5 and the upper wall of the yoke 3. The upper plate spring 5 has a frame on outer circumferential side thereof which frame is fixed to the spacer 4. The spacer 4 is fixed to an inner upper surface of the yoke 3.

(Lens Barrel)

The lens barrel 2 (i) includes an image pickup lens (not illustrated), (ii) has a columnar shape, and (iii) is provided in the fitting hole 8d of the lens holder 8. That is, the lens barrel 2 is held by the lens holder 8. In this state, the lens barrel 2 has a lower end 2b that is in contact with an upper surface, i.e., a contact surface 11a of the base 11.

The lens barrel 2 has a rim in an upper part thereof which rim is provided with a recess 2a recessed with respect to each of an upper surface (light entrance side end surface) and a side surface (outer circumferential surface) of the lens barrel 2. Thus, as illustrated in FIG. 3, at a place where the recess 2a is located, a space is provided between the outer circumferential surface of the lens barrel 2 and an inner circumferential surface of the lens holder 8.

According to the present embodiment, the recess 2a has surfaces extending downwardly from above (from the light entrance side end of the lens barrel 2 toward a bottom of the recess 2a), the surfaces being (i) a vertical wall surface 2a1 being parallel with an axial direction of the lens barrel 2, (ii) an inclined surface 2a2 inclined outward in a radial direction of the lens barrel 2 from a lower end of the vertical wall surface 2a1, and (iii) a bottom surface 2a3 being perpendicular to the axial direction of the lens barrel 2. Further, the recess 2a includes three recesses 2a provided around the lens barrel 2. Note that the number of recesses 2a is not particularly limited but may be one or more. Further, two or more recesses 2a which are provided in the camera module 1 are preferably identical in depth in a vertical direction.

(Lens Holder)

The inner circumferential surface of the lens holder 8 is provided with a groove 8a recessed with respect to the inner circumferential surface of the lens holder 8. According to the present embodiment, the groove 8a is provided on an inner circumferential surface of the fitting hole 8d so as to have an annular shape, the groove 8a being located at a place in the fitting hole 8d of the lens holder 8 at which place the groove 8a faces the recess 2a of the lens barrel 2. Note that the groove 8a does not need to have the annular shape and only needs to be provided so as to at least face the recess 2a of the lens barrel 2.

(Positional Relationship Between Bottom Surface of Recess and Groove: First Positional Relationship)

According to the camera module 1, the bottom surface 2a3 of the recess 2a of the lens barrel 2 and the groove 8a of the lens holder 8 have a positional relationship (first positional relationship) therebetween such that the bottom surface 2a3 of the recess 2a is located between an upper side surface 8a1 and a lower side surface 8a2 of the groove 8a of the lens holder 8.

Note that, in a case where the upper side surface 8a1 of the groove 8a is provided so as to be inclined and the upper side surface 8a1 varies in position in a vertical direction between an inner end and an outer end thereof in the radial direction of the lens holder 8 (see FIG. 3), the upper side surface 8a1 is assumed to be located at a position at which the outer end is located. Similarly, in a case where the lower side surface 8a2 of the groove 8a is provided so as to be inclined and the lower side surface 8a2 varies in position in the vertical direction between an inner end and an outer end thereof in the radial direction of the lens holder 8, the lower side surface 8a2 is assumed to be located at a position at which the outer end is located.

(Adhesive Layer)

According to the camera module 1 of the present embodiment, (i) an upper surface of the lens barrel 2 and (ii) an inner part of the lens holder 8 in the radial direction are exposed from the opening 3a of the yoke 3 in plan view.

Figure 4:
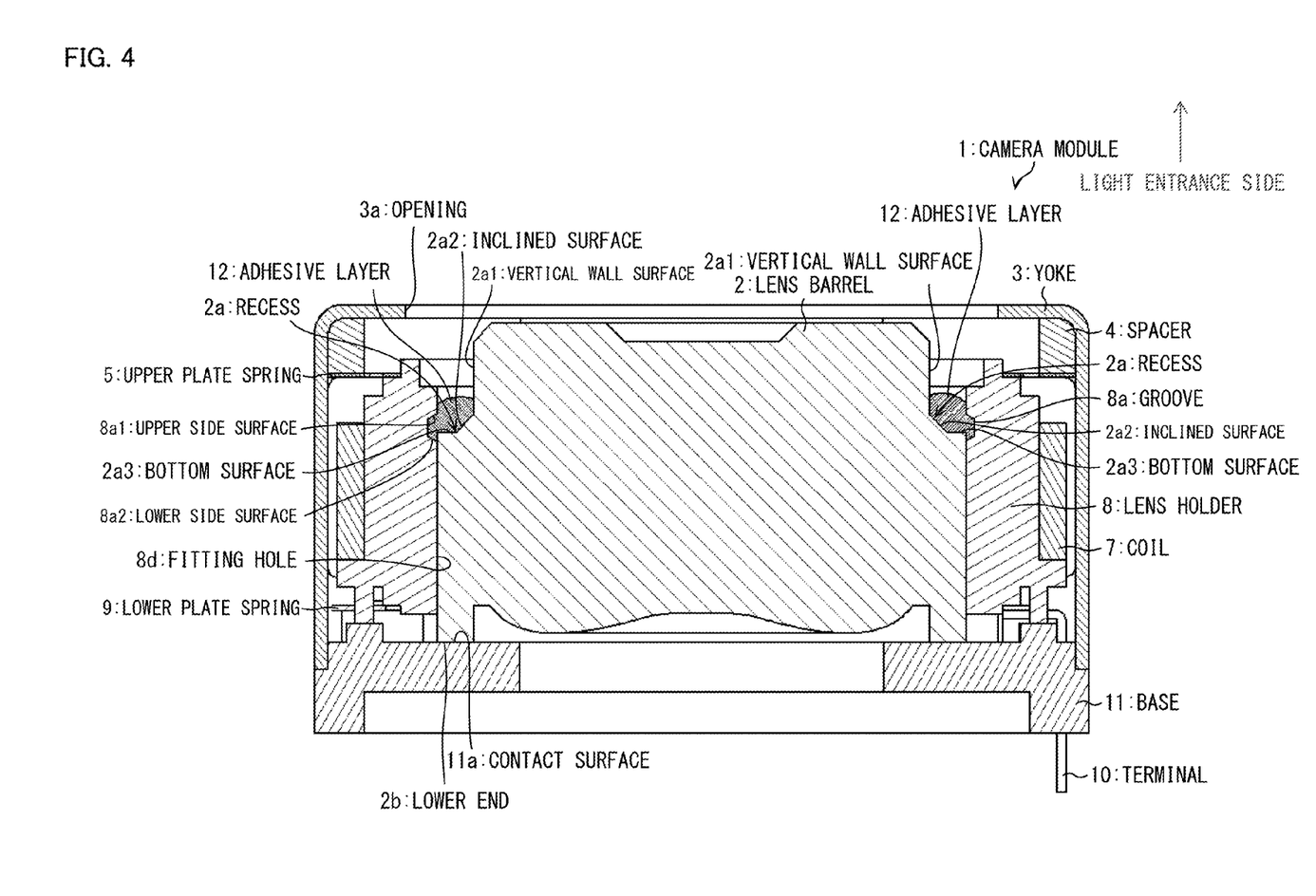
FIG. 4 is a vertical sectional view of the camera module at the same position as that of the camera module of FIG. 3, the vertical sectional view illustrating a state of adhesion between a lens holder and a lens barrel via an adhesive layer

As illustrated in FIG. 4, the lens barrel 2 is fixed to the lens holder 8 by providing an adhesive layer 12 by application of an adhesive to each of the recess 2a of the lens barrel 2 and the groove 8a of the lens holder 8. FIG. 4 is a vertical sectional view of the camera module 1 at the same position as that of the camera module 1 of FIG. 3, the vertical sectional view illustrating a state of adhesion between the lens holder 8 and the lens barrel 2 via the adhesive layer 12.

(Method for Assembling Camera Module)

The following description discusses a method for assembling the camera module 1 arranged as described above.

The camera module 1 is assembled by providing the base 11 with the terminals 10, the lower plate spring 9, the lens holder 8, the coil 7, the magnets 6, the upper plate spring 5, the spacer 4, and the yoke 3 and then inserting the lens barrel 2 into the fitting hole 8d of the lens holder 8.

The lens barrel 2 is fixed to the lens holder 8 by injection of the adhesive into each of the recess 2a of the lens barrel 2 and the groove 8a of the lens holder 8. In this case, as illustrated in FIG. 4, the adhesive is preferably injected to a space above a place at which the upper side surface 8a1 of the groove part 8a is located. Thereafter, the injected adhesive cures, so that the adhesive layer 12 is formed.

(Advantages of Camera Module)

As describe above, the adhesive layer 12, which fixes the lens barrel 2 to the lens holder 8, is provided so as to enter the groove 8a of the lens holder 8 from the recess 2a of the lens barrel 2. Thus, even in a case where the camera module 1 is under great impact, e.g., in a case where the camera module 1 is dropped, it is possible to prevent the lens barrel 2 from dropping off from the lens holder 8.

The adhesive layer 12 is preferably made of an adhesive such as a heat-curing UV adhesive or an anaerobic UV adhesive. This is because of the reasons below. That is, since neither an adhesive having only a heat-curing property nor an adhesive having only an anaerobic property cures in a short period of time, the lens barrel 2 may be positionally displaced before the adhesive cures. Meanwhile, an adhesive having only a UV curing property and having entered a gap between the lens holder 8 and the lens barrel 2 cannot cure.

That is, use of the heat-curing UV adhesive or the anaerobic UV adhesive allows the adhesive which protrudes through a surface so as to form a fillet to cure in a short period of time by a UV curing effect thereof. Further, use of the heat-curing UV adhesive or the anaerobic UV adhesive also allows the adhesive having entered the gap between the lens holder 8 and the lens barrel 2 to heat-cure or anaerobically-cure. Note that it is preferable to use a highly viscous adhesive.

Embodiment 2

Figure 5:
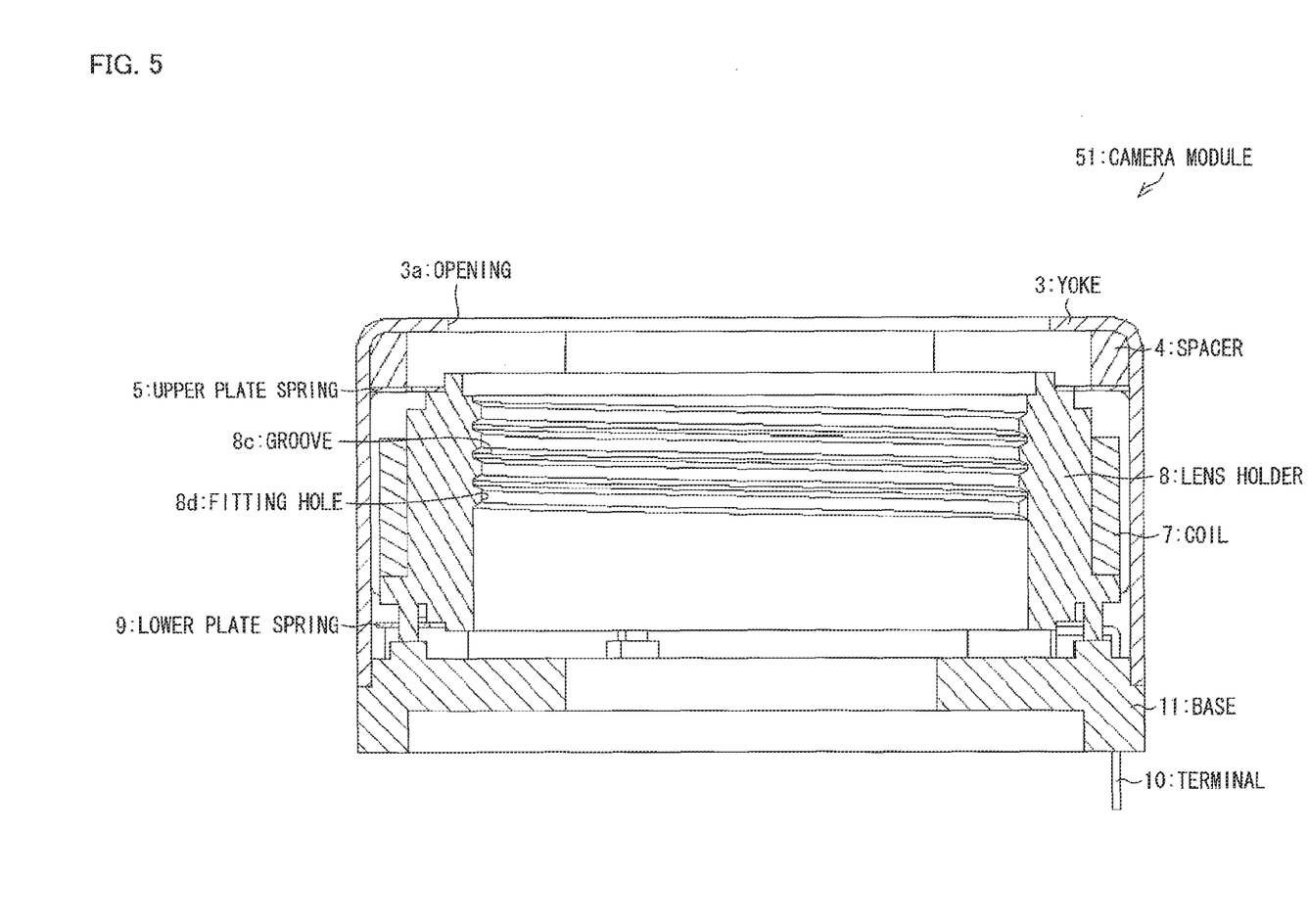
FIG. 5 is a vertical sectional view of a camera module of another embodiment of the present invention, the vertical sectional view illustrating a state before a lens barrel is provided in a lens holder in the camera module.
Figure 6:
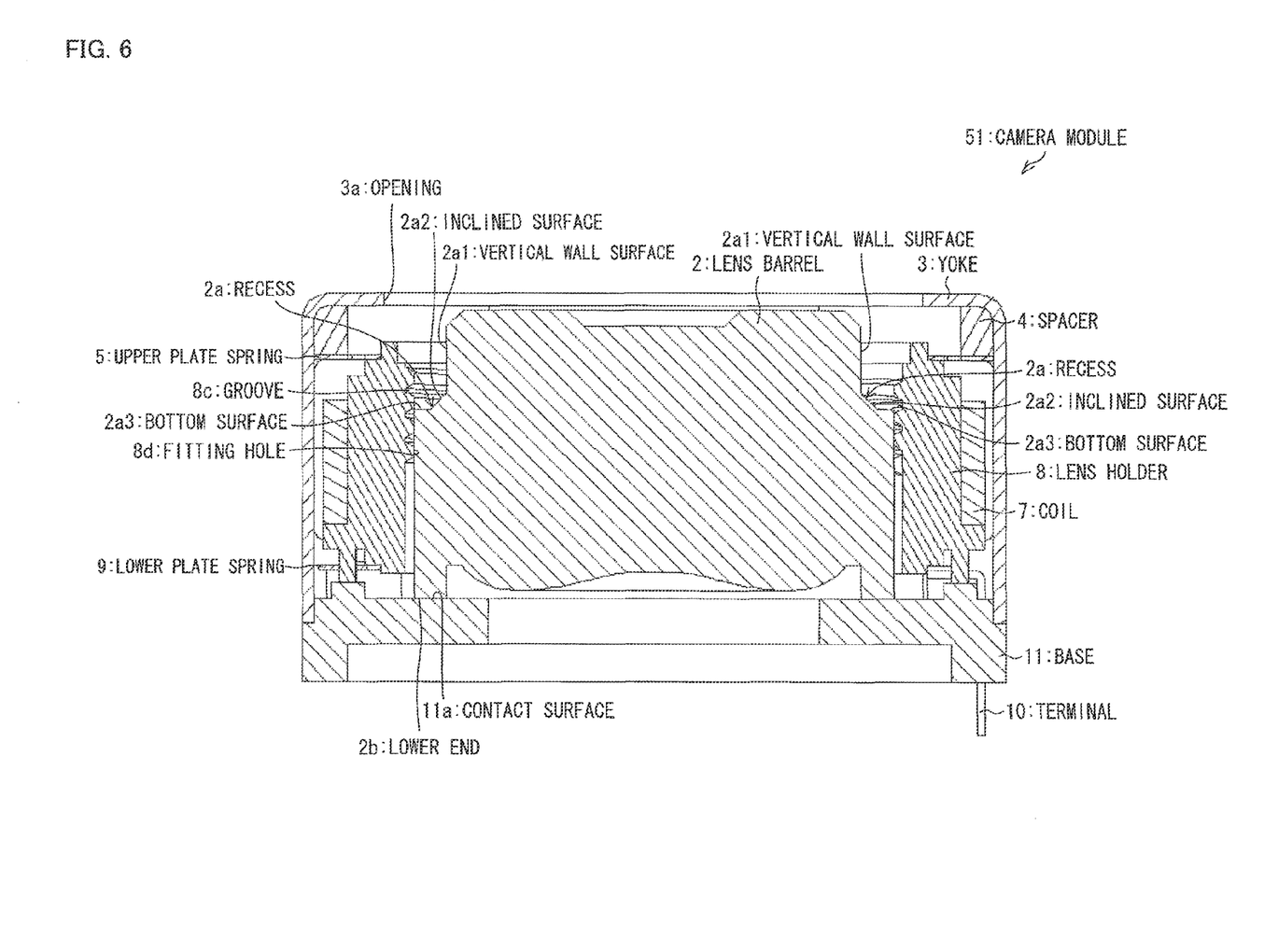
FIG. 6 is a vertical sectional view of the camera module, the vertical sectional view illustrating a state in which the lens barrel has been provided in the lens holder in the camera module after the state of FIG. 5.
Figure 7:
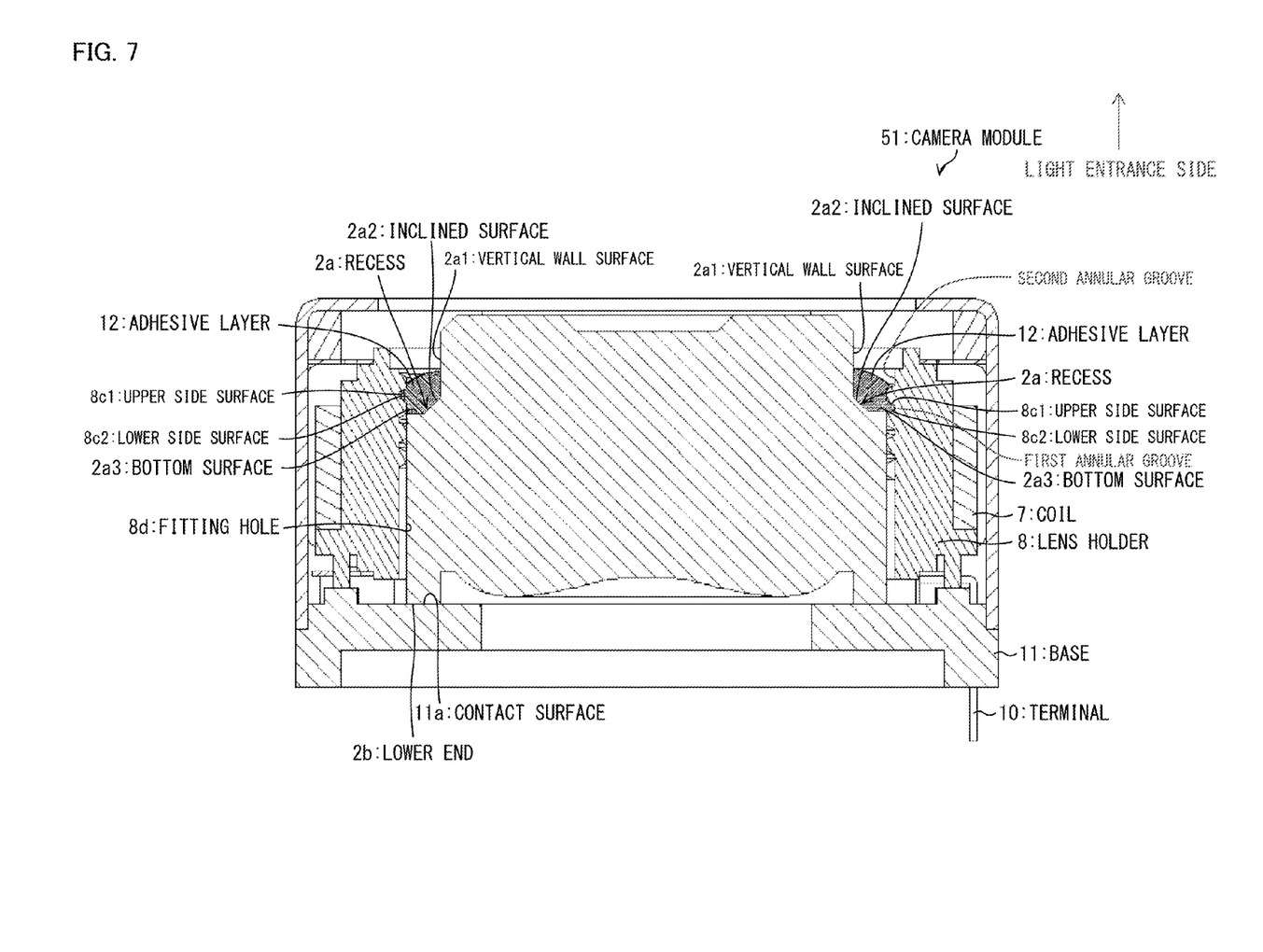
FIG. 7 is a vertical sectional view of the camera module, the vertical sectional view illustrating a state in which the lens holder and the lens barrel adhere to each other via an adhesive layer in the camera module illustrated in FIG. 6.

The following description discusses another embodiment of the present invention with reference to the drawings. FIG. 5 is a vertical sectional view of a camera module 51 of the present embodiment, the vertical sectional view illustrating a state before a lens barrel 2 is provided in a lens holder 8 in the camera module 51. FIG. 6 is a vertical sectional view of the camera module 51, the vertical sectional view illustrating a state in which the lens barrel 2 has been provided in the lens holder 8 in the camera module 51 after the state of FIG. 5. FIG. 7 is a vertical sectional view of the camera module 51, the vertical sectional view illustrating a state in which the lens holder 8 and the lens barrel 2 adhere to each other via an adhesive layer 12.

(Outline of Overall Configuration)

As illustrated in FIG. 5, the lens holder 8 of the camera module 51 of the present embodiment includes a groove 8c, which is a spiral groove, instead of the groove 8a illustrated in FIG. 3. According to the present embodiment, the groove 8c is provided on only an upper one of upper and lower parts of the lens holder 8. The groove 8c is provided so as to face a recess 2a of the lens barrel 2. The camera module 51 is identical in other configuration to the camera module 1.

(Positional Relationship Between Bottom Surface of Recess and Groove: First Positional Relationship)

According to the camera module 51, a bottom surface 2a3 of the recess 2a of the lens barrel 2 and the groove 8c of the lens holder 8 have a positional relationship (first positional relationship) therebetween such that the bottom surface 2a3 of at least one recess 2a (e.g., the right side recess 2a illustrated in each of FIGS. 6 and 7) is located between an upper side surface 8c1 (corresponding to the upper side surface 8a1) and a lower side surface 8c2 (corresponding to the lower side surface 8a2) of the groove 8c of the lens holder 8.

In such a case, the first positional relationship can be formed after one or more turns of the groove 8c which start from an upper end (an end closer to the light entrance side end surface of the lens barrel 2) of the groove 8c, which is the spiral groove.

The camera module 51 arranged as described above can be assembled as in the case of the camera module 1.

(Advantages of Camera Module)

The camera module 51, in which the groove 8c of the lens holder 8 is the spiral groove, allows a simple structure of a mold by which to form the groove 8a on an inner circumferential surface of a fitting hole 8d of the lens holder 8. This allows a reduction in cost. Further, the adhesive layer 12 is provided by a flow, along the groove 8c, i.e., the spiral groove, of an adhesive supplied to the groove 8c, and by filling of the spiral groove with the adhesive. This allows firmer adhesion between the lens holder 8 and the lens barrel 2.

(Number of Recesses)

According to the present embodiment, the number of recesses 2a provided in the lens barrel 2 is not particularly limited but may be one or more. Further, also in a case where two or more recesses 2a are provided, an angle at which those recesses 2a are placed is not particularly limited. However, as an embodiment (Embodiment 3), two or more recesses 2a are preferably provided and placed at equiangular intervals (axially symmetrically with respect to an optical axis).

That is, since a first place in the lens barrel 2 at which first place the recess 2a is provided and a second place in the lens barrel 2 at which second place no recess 2a is provided differ in amount of adhesive of which the adhesive layer 12 is made, the first place and the second place also differ in cure shrinkage of the adhesive accordingly. Thus, two or more recesses 2a which are provided axially symmetrically with respect to the optical axis can prevent the lens barrel 2 from being inclined toward the optical axis due to an imbalance in cure shrinkage of the adhesive.

The descriptions of the embodiments each have taken a VCM autofocus camera module as an example. Note, however, that the present invention is not limited to an autofocus camera module.

CONCLUSION

A camera module according to Aspect 1 of the present invention is a camera module including: a lens holding member (lens barrel 2) for holding an image pickup lens; a cylindrical holding member (lens holder 8) for holding the lens holding member; and an adhesive layer 12 for causing the lens holding member and the cylindrical holding member to adhere to each other, the cylindrical holding member (i) having a shape of a cylinder having a fitting hole 8d, (ii) holding the lens holding member in a state in which the lens holding member is fitted in the fitting hole 8d, and (iii) having an inner circumferential surface on which the fitting hole 8d is provided, the inner circumferential surface having a groove 8a that is provided in a circumferential direction, the lens holding member having a recess 2a recessed with respect to each of a light entrance side end surface and an outer circumferential surface of the lens holding member, the outer circumferential surface facing the inner circumferential surface of the cylindrical holding member, the recess 2a having a bottom surface 2a3 located at a place in a light entrance direction, and the bottom surface 2a3 and the groove 8a having a first positional relationship therebetween such that the bottom surface 2a3 of the recess 2a is located between an upper side surface (upper side surface 8a1) and a lower side surface (lower side surface 8a2) of the groove 8a in a direction toward the light entrance side end surface, and the adhesive layer 12 being provided on the bottom surface 2a3 of the recess 2a so as to extend into the groove 8a, the groove 8a being located so as to face the recess 2a.

According to the above arrangement, the cylindrical holding member holds the lens holding member in a state in which the lens holding member is fitted in the fitting hole 8d. The lens holding member has the recess 2a recessed with respect to each of the light entrance side end surface and the outer circumferential surface of the lens holding member, the outer circumferential surface facing the inner circumferential surface of the cylindrical holding member. The bottom surface 2a3 of the recess 2a is located between the upper side surface and the lower side surface of the groove 8a of the cylindrical holding member in a direction toward the light entrance side end surface (first positional relationship). The adhesive layer 12 is provided on the bottom surface 2a3 of the recess 2a so as to extend into the groove 8a, the groove 8a being located so as to face the recess 2a.

Thus, an adhesive supplied to the recess 2a of the lens holding member so as to form the adhesive layer 12 is guided to the bottom surface 2a3 of the recess 2a, so that the bottom surface 2a3 of the recess 2a can be filled with the adhesive without fail. This allows (i) a smaller amount of adhesive with which the recess 2a of the lens holding member is filled and (ii) a less great tensile force exerted on the lens holding member due to cure shrinkage of the adhesive. Consequently, it is possible to use the adhesive in a small amount to cause the lens holding member holding the image pickup lens and the cylindrical holding member holding the lens holding member to adhere to each other with higher adhesive strength and a simple configuration without causing a deterioration in assembly accuracy. Further, it is also possible to prevent the lens holding member from being inclined due to an imbalance in cure shrinkage of the adhesive.

In Aspect 2 of the present invention, the camera module according to Aspect 1 of the present invention can be arranged such that: the recess 2a has surfaces extending from the light entrance side end of the lens holding member toward a bottom of the recess 2a, the surfaces being (i) a vertical wall surface 2a1 being parallel with an axial direction of the lens holding member, (ii) an inclined surface 2a2 inclined outward in a radial direction of the lens holding member from a lower end of the vertical wall surface 2a1, and (iii) the bottom surface 2a3 being perpendicular to the axial direction of the lens holding member.

According to the above configuration, the adhesive supplied to the recess 2a of the lens holding member so as to form the adhesive layer 12 easily flows toward the groove 8a of the cylindrical holding member due to a shape of the recess 2a, which has the vertical wall surface 2a1, the inclined surface 2a2, and the bottom surface 2a3, so that the adhesive is supplied to the recess 2a and the groove 8a without fail. Further, the recess 2a, which has the inclined surface 2a2, allows (i) a smaller amount of adhesive with which the recess 2a of the lens holding member is filled and (ii) a less great tensile force exerted on the lens holding member due to cure shrinkage of the adhesive. This makes it possible to further ensure (i) that the adhesive is used in a small amount to cause the lens holding member and the cylindrical holding member to adhere to each other and (ii) that the lens barrel is prevented from being inclined due to an imbalance in cure shrinkage of the adhesive.

In Aspect 3 of the present invention, the camera module according to Aspect 1 or 2 of the present invention can be arranged such that the groove 8a is an annular groove.

According to the above arrangement, the groove 8a is the annular groove. Thus, also in a case where the lens holding member has two or more recesses 2a, a single annular groove allows easy formation of the first positional relationship between the groove 8a and the two or more recesses 2a.

In Aspect 4 of the present invention, the camera module according to Aspect 3 of the present invention can be arranged such that: the groove having the first positional relationship is a first annular groove, and the inner circumferential surface of the cylindrical holding member is provided with a second annular groove that is located so as to be closer to the light entrance side end surface of the lens holding member than the first annular groove; and the adhesive layer 12 is provided on the bottom surface 2a3 of the recess 2a so as to extend into each of the first annular groove and the second annular groove.

According to the above arrangement, the adhesive layer 12 is provided on the bottom surface 2a3 of the recess 2a of the lens holding member so as to extend into each of the first annular groove of the cylindrical holding member and the second annular groove, the second groove being located so as to be closer to the light entrance side end surface of the lens holding member than the first annular groove. This allows the lens holding member and the cylindrical holding member to adhere to each other with still higher adhesive strength.

In Aspect 5 of the present invention, the camera module according to Aspect 1 or 2 of the present invention can be arranged such that the groove 8c is a spiral groove, and the first positional relationship is formed after one or more turns of the spiral groove which start from an end of the spiral groove which end is closer to the light entrance side end surface of the lens holding member.

The groove 8c, which is the spiral groove, allows a simple structure of a mold by which to form the groove 8c on an inner circumferential surface of the fitting hole 8d of the cylindrical holding member. This allows a reduction in cost. Further, the adhesive layer 12 is provided by a flow, along the groove 8c, i.e., the spiral groove, of an adhesive supplied to the groove 8c, and by filling of the spiral groove with the adhesive. This allows firmer adhesion between the lens holding member and the cylindrical holding member.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Furthermore, the technical means disclosed in the embodiments can be combined to form a new technical feature.

INDUSTRIAL APPLICABILITY

The present invention can be used in an electronic device (e.g., a mobile phone) having a function of picking up an image or a video, or in the field of production of components constituting the electronic device.

REFERENCE SIGNS LIST

1 Camera Module
2 Lens Barrel
2a Recess
2a1 Vertical Wall Surface
2a2 Inclined Surface
2a3 Bottom Surface
3 Yoke
3a Opening
4 Spacer
5 Upper Plate Spring
6 Magnet
7 Coil
8 Lens Holder
8a Groove
8a1 Upper Side Surface
8a2 Lower Side Surface
8c Groove
8c1 Upper Side Surface
8c2 Lower Side Surface
8d Fitting Hole
9 Lower Plate Spring
10 Terminal
11 Base
11a Contact Surface
12 Adhesive Layer
51 Camera Module

The invention claimed is:

1. A camera module comprising: a lens holding member configured to hold an image pickup lens; a cylindrical holding member configured to hold the lens holding member; and an adhesive layer configured to cause the lens holding member and the cylindrical holding member to adhere to each other, the cylindrical holding member (i) comprising a shape of a cylinder having a fitting hole, (ii) holding the lens holding member in a state in which the lens holding member is fitted in the fitting hole, and (iii) comprising an inner circumferential surface on which the fitting hole is provided, the inner circumferential surface comprising a groove that is provided in a circumferential direction, the lens holding member comprising a recess obtained by recessing each of a light entrance side end surface and an outer circumferential surface of the lens holding member, the outer circumferential surface facing the inner circumferential surface of the cylindrical holding member, the recess comprises surfaces extending from the light entrance side end of the lens holding member toward a bottom of the recess, the surfaces being (i) a vertical wall surface being parallel with an axial direction of the lens holding member, (ii) an inclined surface inclined outward in a radial direction of the lens holding member from a lower end of the vertical wall surface, and (iii) the bottom surface being perpendicular to the axial direction of the lens holding member, the recess comprising a bottom surface facing a light entrance direction, and the bottom surface and the groove comprising a first positional relationship therebetween such that the bottom surface of the recess is located between an upper side surface and a lower side surface of the groove in a direction toward the light entrance side end surface, and the adhesive layer being provided on the bottom surface of the recess so as to extend into the groove and enter a gap between the recess and the groove, the groove being located so as to face the recess.

2. The camera module as set forth in claim 1, wherein the groove is an annular groove.

3. The camera module as set forth in claim 2, wherein:
the groove having the first positional relationship is a first annular groove, and the first annular groove comprises a second annular groove in a part that is closer to a light entrance side of the lens holding member; and
the adhesive layer is provided on the bottom surface of the recess so as to extend into each of the first annular groove and the second annular groove.

4. The camera module as set forth in claim 1, wherein the groove is a spiral groove, and the bottom surface of the recess and the spiral groove have the first positional relationship therebetween, the first positional relationship being formed after one or more turns of the spiral groove which start from an end of the spiral groove which end is closer to the light entrance side end surface of the lens holding member.

5. The camera module as set forth in claim 4, wherein the lens holding member does not have a groove that corresponds to the spiral groove of the cylindrical holding member.

* * * * *